INVENTORS
FRANK ARNOLD
HENRY L. BUNGART
ALBEN J. TAVA
BY Arthur H. Serrell
ATTORNEY

United States Patent Office 3,263,646
Patented August 2, 1966

3,263,646
WINDOW ASSEMBLY FOR DIRECT READING INSTRUMENTS
Frank Arnold, Locust Valley, Henry L. Bungart, Huntington Station, and Alben J. Tava, Hicksville, N.Y., assignors to Sperry Rand Corporation, Great Neck, N.Y., a corporation of Delaware
Filed Dec. 6, 1963, Ser. No. 328,654
5 Claims. (Cl. 116—129)

This invention relates to a window assembly for the housing of an indicating instrument of the direct reading type that provides an optical arrangement of wedge lighting lens, translucent element or ring, masking member or element and light source. Where the relatively movable dial in the housing of the indicating instrument readable on the indicia of the masking element has a curved face extending through an opening in the mask, the improved arrangement obviates the need of constructing the dial of translucent material and including an independent internal source of light therein to remove shadows at the rim of the mask opening in the frontal illumination provided by a wedge lighting lens. Accordingly, no source of light is included in the instrument that is independent of the assembly.

An object of the invention is to provide an assembly of the character described in which an incandescent lamp source thereon transmits light to the rim of a wedge lighting lens through the translucent element or ring as well as provide illumination for the portion of the curved face of the dial behind the masking member. The illumination directed behind the masking member or element supplements the frontal wedge lighting of the curved dial and obviates the formation of shadows at the rim of the opening in the masking member.

In accordance with the invention, the improved assembly provides an optical arrangement in the window of the housing of an indicating instrument that includes the heretofore noted components as well as a light shield where the masking member is ahead of the dial, the lens is ahead of both the masking member and dial, the translucent element or ring encircles the masking member and includes a part forward of the member connected in light transmitting relation to the lens and a part rearward of the member, and the light source is located between the rim of the ring and the shield. The noted positions of the components are stated with relation to an observer viewing the dial and masking member along a line of sight through the window assembly where the translucent ring is arranged in the housing in concentric relation to the line of sight with the dial being the component most remote from the observer and the lens being the component closest to the observer.

Further objects, features and structural details of the present invention will be apparent from the following description when read in relation to the accompanying drawings, wherein.

As shown, the improved window assembly is embodied in a direct reading instrument of the type described in U.S. Letters Patent No. 2,940,176, issued June 14, 1960, to J. M. Jessup for a horizon indicator. The represented indicator is mounted on the instrument panel of an aircraft in front of an observer or human pilot who reads the pivoted indicia through a window opening in the housing. The indicia of the instrument read by the human pilot is the attitude of the aircraft in both pitch and roll or flight condition with relation to its respective athwartship and longitudinal axes.

Figure 1:
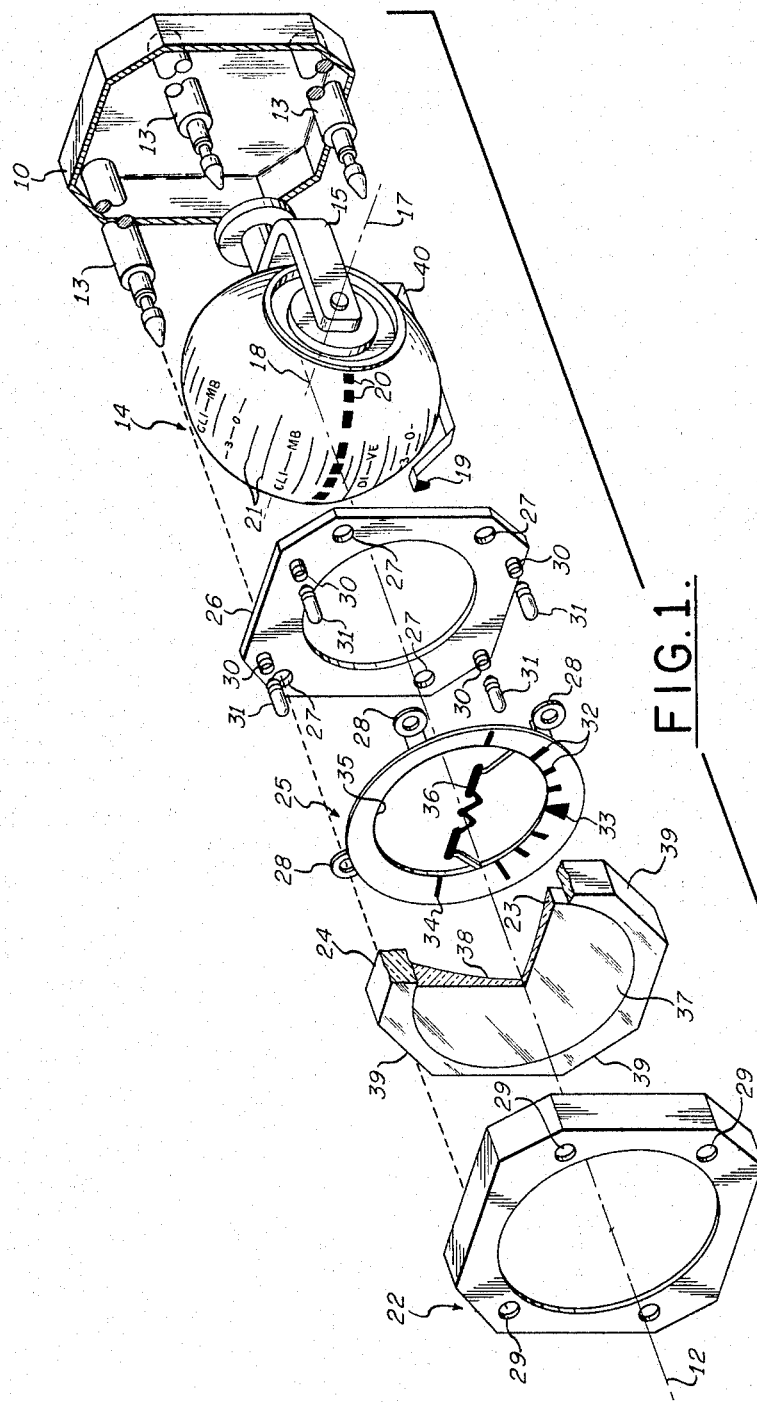
FIG. 1 is a perspective view of the components of the improved window assembly and the background dial of the indicating instrument shown in exploded relation.

The illustrative indicator shown in the drawings includes a housing 10 that is fixedly mounted on the instrument panel of the aircraft by suitable fastenings, not shown. The front wall of the housing 10 is provided with a window opening 11 through which the human pilot observes hereafter described indicia along a line of sight 12. As shown in FIG. 1, the rear wall of the housing is provided with a plurality of forwardly extending posts 13 by which the components of the improved window assembly are mounted in fixed condition in the housing.

Figure 2:
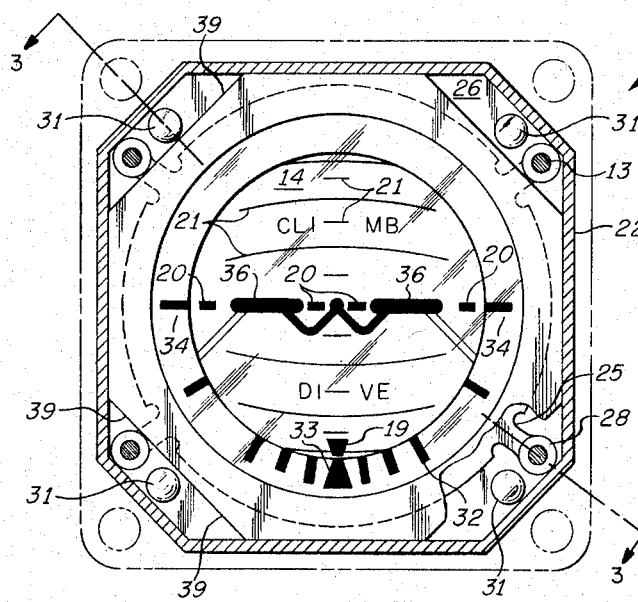
FIG. 2 is a cross sectional view taken on line 2—2 in FIG. 3 of the instrument shown in FIG. 1 with the components in assembled condition.
Figure 3:
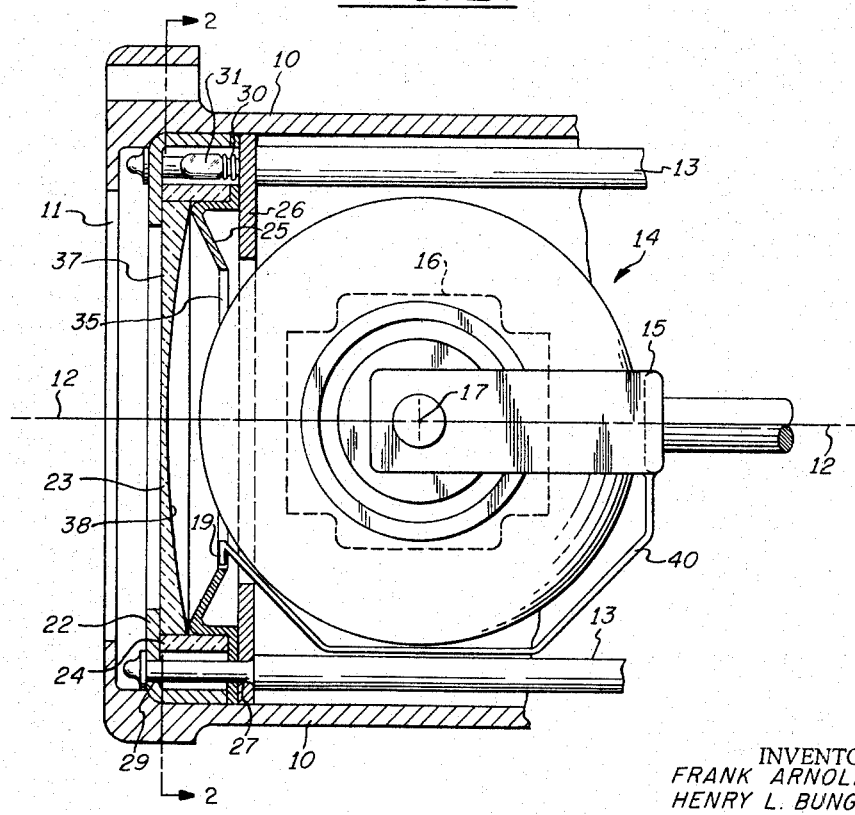
FIG. 3 is a cross sectional view taken on line 3—3 in FIG. 2.

As represented in FIGS. 1 and 2, the indicator further includes a background dial 14 that is universally mounted in the housing 10 through connecting gimbal ring 15. In the horizon indicator shown, the dial is provided by a spherical shell fixed to the case 16, FIG. 3, of a gyroscopic rotor that spins about a normally vertical axis. The gimbal 15 of the arrangement mounts the shell with freedom with relation to the housing 10 about a longitudinal axis corresponding to the line of sight 12 and about a lateral axis 17 perpendicular to the line 12. The dial 14 of the instrument is accordingly universally mounted in the housing at a point 18 on the line of sight 12. In the illustrated instrument, the case 16 provides stability for the dial 14 and the housing 10 fixed to the aircraft moves therewith as it maneuvers about its pitch and roll axes. In simulating flight instruments, the housing 10 is fixed with relation to a relatively movable dial 14 that may be driven about axis 17 as well as the axis of gimbal 15 corresponding to the line of sight 12 by external means (not shown). The portion of the roll indicia of the instrument movable with relation to the observer is indicated by a pointer 19. As shown in FIGS. 1 and 3, pointer 19 is fixed to one end of an arm 40 that is suitably connected at its other end to the gimbal 15. The portion of the pitch indicia provided on the curved or spherical face of the dial is indicated by a pitch scale that encircles the face of the shell with relation to axis 17. The index portion of the scale indicating the horizon or zero pitch attitude of the craft is designated by a dash line 20 that crosses the face of the shell. The parallel spaced full lines of the pitch indicia scale on the dial 14 are indicated at 21. In the window type of instrument shown in the drawing, the line of sight 12 is normal to the plane of the window opening 11.

The window and instrument illuminating assembly of the present invention and shown in FIG. 1, includes a light shield 22 whose front face fits the bezel provided in the housing 10 to the rear of the window 11, a wedge lighting lens 23, a translucent element or diffusing ring 24, a member or element for masking a portion of the dial 14 indicated at 25 and a mounting plate 26 for the incandescent lamps providing the source of light for the instrument. The components of the assembly are fixedly connected to the housing 10 on the shouldered ends of the posts 13 by means of mating openings 27 in the plate 26, tab pieces 28 on the masking element, and corresponding openings 29 in the light shield 22.

The plate 26 of the assembly is the component positioned closest to the dial 14. As shown, plate 26 includes four corner sockets 30 for respective incandescent lamps 31 that provide the source of illumination for the masking member 25 and the dial 14. The lamps or electric light bulbs 31 are energized from a suitable source by way of a conventional electric circuit (not shown).

Member or element 25 of the assembly is positioned ahead of the dial with respect to the observer to mask a portion of the face of the dial 14 and the arm 40. The generally conical face of the masking member 25 includes a circular opening 35 that is arranged in concentric relation to the line of sight 12. The indicia provided on the face of the element 25 includes a roll scale 32 of lines thereon radial of the line of sight 12, with a zero roll index 33. In observing the attitude of the aircraft with relation to its longitudinal axis, the human pilot reads the roll indicia 32 on the front face of the member 25 with relation to the pointer 19. When the pointer 19 corresponds with the index 33 as shown in FIG. 2, the wings of the aircraft are level with the craft being free of tilt about its longitudinal axis. As the craft moves about its longitudinal axis from the indicated attitude, the craft banks with the roll scale 32 moving with relation to the pointer 19 in the same degree and sense to indicate the roll condition of the craft to the human pilot through a range of 120 degrees. It should be noted that a substantial space between the inner periphery of mask 25 and the surface of sphere 14 is required to accommodate the roll pointer 19. This space would, without the novel lighting arrangement of the present invention, result in a shadow being cast on the sphere by mask 25 thereby producing an objectional darkened area which would tend to obscure any indicia on the sphere in this area, such as, for example, indicia 20 and 21. The pitch indicia provided on the masking element includes lines 34 radial of the line of sight 12 disposed on opposite sides of the opening 35 and the representation of an aircraft extending across the opening 35 with the wings 36. The pitch attitude read by the human pilot in observing the components of the indicator shown in FIG. 2 is one in which the wings of the craft are level with the artificial horizon line 20 so that the aircraft is moving in a horizontal plane in a level condition with relation to its athwartship axis. As the craft moves about its athwartship axis, the noted pitch indicia on the masking element 25 moves with respect to the related pitch scale 21 on the dial 14 in corresponding degree and sense to indicate the pitch condition of the craft through a range of less than 180 degrees to the human pilot. In the horizon indicator instrument shown, the indicia on the masking element 25 is read with the indicia on the portion of the curved face of the dial appearing at the opening in the mask.

In the improved assembly, the lens 23 and diffusing element or ring 24 are optically arranged to provide frontal illumination for the curved faces of member 25, dial 14 and pointer 19 as well as rearward illumination for the curved face of the dial behind the masking member. In the structure shown in FIGS. 1 and 2, the optical parts are preferably individual interfitting pieces that are cemented together with a cement which has an index of refraction approximately equal to glass to form a single assembly component with a portion of the ring forward of the masking element connected to the lens in light transmitting relation and a portion rearward of the masking element. The lens 23 per se of the assembly provides frontal illumination of the wedge lighting type as described in U.S. Letters Patent No. 3,029,334 issued April 10, 1962, to G. R. Anderson et al. for Illuminating Means for Direct Reading Instruments. With respect to the housing 10, the planar exterior face 37 of the lens 23 is normal to the line of sight 12 and the interior face 38 is concave with a spherical curve symmetrical to the sight line 12. The indicia is read through the window of the assembly provided by the lens 23. Element 24 of the assembly is preferably interfitted with the lens 23 concentrically and is formed of glass as represented in FIG. 1 with a frost ground internal rim.

In the improved assembly, the peripheral rim configuration of the element 24 is octagonal whereby to provide a flat side or surface 39 at the corners of the instrument for accommodating each of the four lamps 31 with such light sources being juxtaposed thereto. As shown in FIG. 2, the shield 22 of the assembly fits on other of the opposed sides of the rim of the ring 24 with the lamps 31 between the shield 22 and the ring. The translucent element 24 of assembly is mounted in encircling relation to the masking member and in concentric relation to the line 12 between the lens 23 and the source of light or lamps 31. The light transmitted to the rim of the lens 23 in the part of the element 24 forward of the masking element provides the required frontal illumination for the indicia on the front face of the masking member and the curved face of the dial 14 appearing at the opening 35. The face of the dial 14 behind the masking member 25 is illuminated by the light in the portion of the diffusing ring element 24 extending rearwardly of the member 25. The arrangement produces a uniformly illuminated display of the provided indicia without requiring independent light sources within the dial element 14. It also eliminates shadows as well as high contrast areas on the face of the dial 14 about the rim of the mask opening 35.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an integrally lighted indicating instrument of the type which includes a housing having a viewing opening in a front end wall thereof, a spherically shaped indicating dial having indicia thereon universally supported in the housing adjacent said opening for indicating relative movements of said dial and housing about longitudinal and lateral axes of said housing; a window and instrument illuminating assembly fixed in the front end wall of said housing and forming a transparent front closure therefor, said assembly comprising:
    (a) an opaque masking member having a circular opening exposing a portion of said spherical dial but laterally spaced from the surface thereof, and including reference indicia cooperable with the indicia on said dial,
    (b) a ring member of translucent material having substantial longitudinal thickness surrounding said masking member, a portion thereof extending longitudinally forward of said member and a portion extending longitudinally rearward of said member,
    (c) a transparent dial cover lens of the wedge lighting type having a longitudinally thickened rim connected in light conducting relation to the forwardly extending portion of said ring member, and
    (d) a light source adjacent said ring member for illuminating said exposed spherical dial and masking member through said ring and wedge lighting lens and for illuminating the said exposed spherical dial adjacent said circular opening through the rearwardly extending portion of said ring member whereby to eliminate shadows which would otherwise be cast on said spherical dial by said masking member.

2. The window and instrument lighting assembly as set forth in claim 1, wherein said translucent ring and lens are cemented together with a cement having an index of refraction substantially equal to that of the ring and lens whereby to form a single optical window assembly component.

3. The window and instrument lighting assembly as set forth in claim 2, wherein said assembly further includes a support plate connected with said instrument housing for supporting said masking member and said optical assembly component and wherein said light source includes a plurality of incandescent lamps, and socket means supported by said plate for receiving said lamps.

4. The window and instrument lighting assembly as set forth in claim 3, wherein said assembly further includes an opaque light shield having a circular opening substantially larger than the opening in said masking member and slightly smaller than the junction between said ring and lens and having side walls substantially equal in length to the longitudinal thickness of said translucent ring.

5. In an integrally lighted indicating instrument of the type which includes a housing having a viewing opening in a front end wall thereof, a spherically shaped indicating dial having indicia thereon universally supported in the housing adjacent said opening for indicating relative movements of said dial and housing about longitudinal and lateral axes of said housing, a window and instrument illuminating assembly fixed in the front end wall of said housing and forming a transparent front closure therefor, said assembly comprising:

(a) an optical component comprising a transparent dial cover lens of the wedge lighting type having a longitudinally thickened outer portion for transmitting light uniformly to said indicating dial and having an outer ring portion extending longitudinally rearwardly of said thickened lens portion, (b) a longitudinally thin opaque masking member having a circular opening exposing a portion of said spherical dial and including reference indicia cooperable with the indicia on said spherical surface, said masking member having an outer peripheral edge closely adjacent the thickened outer portion of said lens whereby the outer ring portion extends rearwardly beyond said masking member, and (c) a light source adjacent said ring portion for illuminating said exposed spherical dial and masking member through said ring and wedge lighting lens and for illuminating the said exposed spherical dial adjacent said ciruclar opening through the rearwardly extending portion of said ring portion.

References Cited by the Examiner

UNITED STATES PATENTS

| | | | |
|---|---|---|---|
| 1,973,728 | 9/1934 | Salzgeber | 240—2.1 |
| 2,251,984 | 8/1941 | Cleaver et al. | 240—1 |
| 2,578,177 | 12/1951 | Dehmel | 116—129 X |
| 2,761,056 | 8/1956 | Lazo | 116—129 X |
| 2,907,869 | 10/1959 | Hudson et al. | 240—2.1 |
| 2,965,749 | 12/1960 | Hudson | 240—2.1 |
| 2,984,206 | 5/1961 | Tyler et al. | 116—129 |
| 3,029,334 | 4/1962 | Anderson et al. | 240—1 |
| 3,068,833 | 12/1962 | Hoffman | 116—129 |

LOUIS J. CAPOZI, *Primary Examiner.*